United States Patent
Allen et al.

[15] 3,681,997
[45] Aug. 8, 1972

[54] COMPOSITE PIPELINE SAMPLER

[72] Inventors: Paul V. Allen; Edward W. McAllister, both of Houston, Tex.

[73] Assignee: Gulf Refining Company, Houston, Tex.

[22] Filed: March 16, 1971

[21] Appl. No.: 124,763

[52] U.S. Cl. ............................................73/422 TC
[51] Int. Cl. ..................................................G01n 1/14
[58] Field of Search ......................73/422 R, 422 TC

[56] References Cited

UNITED STATES PATENTS

| | | | |
|---|---|---|---|
| 2,284,560 | 5/1942 | Corneil | 73/422 R |
| 2,636,387 | 4/1953 | McKinney | 73/422 R |
| 2,637,211 | 5/1953 | Norman, Jr. | 73/422 R |
| 3,282,113 | 11/1966 | Sachnik | 73/422 R |
| 3,504,549 | 4/1970 | Davis et al. | 73/422 TC |

*Primary Examiner*—S. Clement Swisher
*Attorney*—Meyer Neishloss, Deane E. Keith and Paul L. Tillson

[57] ABSTRACT

Apparatus for obtaining a composite and proportional sample of liquid flowing through a pipeline in which an obstruction is installed to produce a pressure drop sufficient to cause appreciable flow through a sampling line connected to the pipeline upstream and downstream of the obstruction. A sampler pump connected into the sampling line periodically displaces a predetermined portion of the liquid flowing through the pipeline into a sample container maintained full of liquid and at a pressure enough higher than the vapor pressure of the most volatile component present in the product to be sampled to prevent vaporization of the volatile components of the liquid sampled. An accumulator in the line from the sample container to a displacement liquid reservoir protects the sample container from drops in pressure that might cause vaporization of the sample, and a bypass and rupture plug assembly protects the sample container from excessive pressure.

6 Claims, 1 Drawing Figure

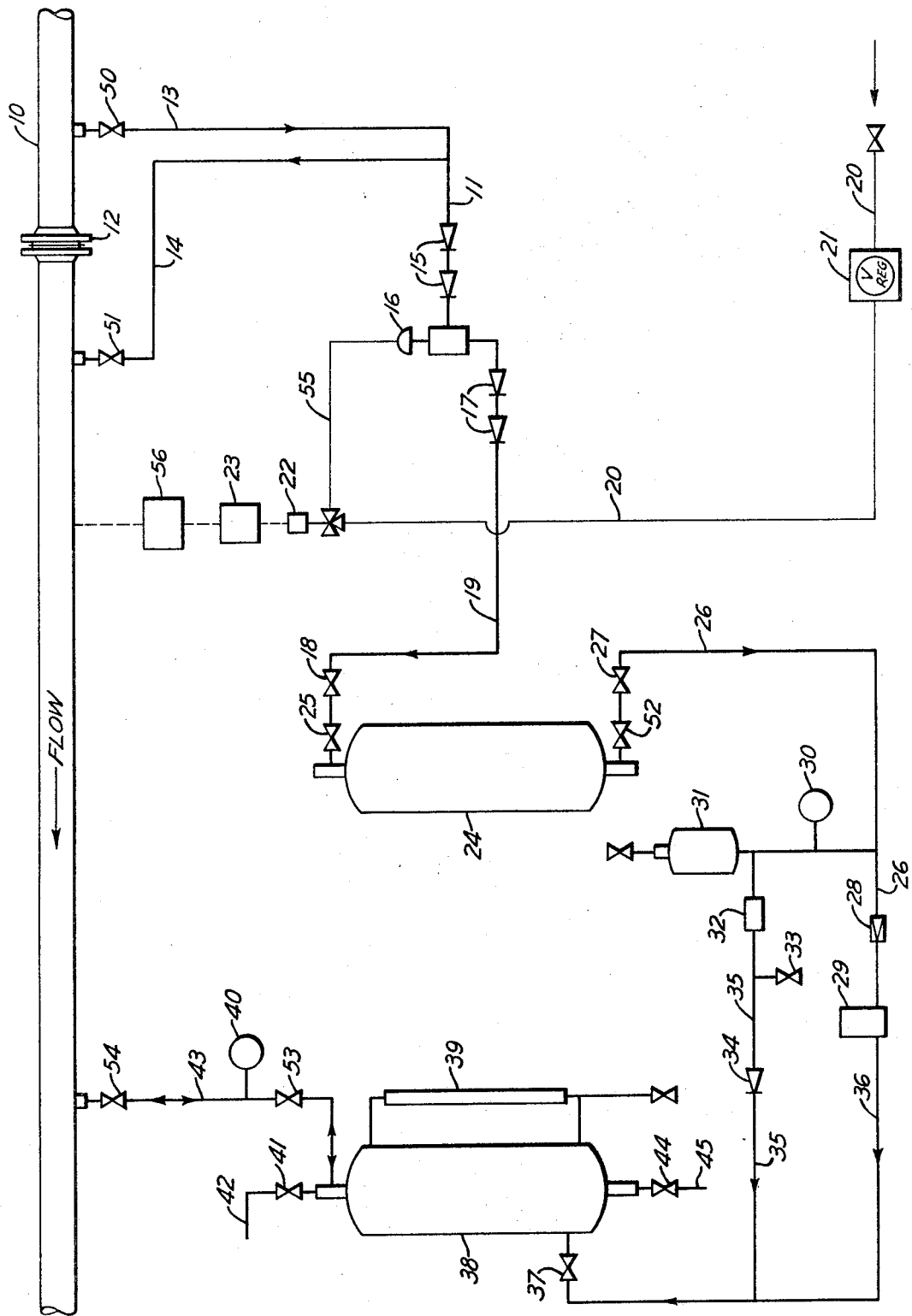

COMPOSITE PIPELINE SAMPLER

This invention relates to the sampling of liquids flowing through pipelines and more particularly to a method and apparatus for obtaining a proportional composite sample of the pipeline liquids without alteration of the composition of the liquids as a result of vaporization of components in the sample.

Accurate measurement of petroleum hydrocarbon liquids flowing through pipelines is necessary for many purposes, such as proper billing of the party receiving the liquids. To obtain the desired accuracy in the measurement, it is essential that both the volume and the composition of the liquids flowing through the pipeline be obtained. The composition is obtained by analysis of a sample of the liquids. It is contemplated that the composition of the liquids flowing through a pipeline will vary from time to time. To avoid the necessity of individual analysis of spot samples, it is desirable to obtain a composite sample that will be representative of the composition of the liquids flowing through the pipeline over a convenient period of time and analyze the composite sample.

Petroleum hydrocarbon liquids are usually a mixture of hydrocarbons of different molecular weight. Although the molecular weight of the individual hydrocarbon compounds may not vary widely, the difference in vapor pressure exerted by the individual compounds at the pipeline temperature may be substantial. Variation in vapor pressure of the individual compounds, even though the compounds do not differ substantially in molecular weight, is especially large in mixtures of propane, butane and small amounts of higher molecular weight hydrocarbons such as pentane. Such mixtures are referred to as LPG. If any part of the LPG mixture is allowed to vaporize, a substantial change in the composition of the liquid will occur. If part of the liquids become vaporized as a result of reduction of pressure on the liquids, re-application of the pressure that had prevented vaporization cannot be relied on to condense the vapors. Hence, it is essential to maintain the sample of the pipeline liquids in the liquid phase at all times before analysis of the sample.

Occasionally, flow through the pipeline is interrupted. In many areas such as West Texas, in which volatile liquids, particularly LPG, are delivered through pipelines, there are rapid and large changes in temperature. A drop in temperature can cause enough contraction of the liquid to reduce the pressure within the sample collection system to a level at which substantial vaporization of the sampled pipeline liquids occurs. It is important to provide means that will allow the sampling apparatus to remain filled with liquid, ready for immediate resumption of sampling, when the pipeline is shut down.

This invention resides in an apparatus and a method for obtaining a composite sample of pipeline liquids in which an obstruction is installed in the pipeline to produce a pressure drop adequate to cause appreciable flow to the sampling apparatus connected to the pipeline and bypassing the obstruction. The flow through the sampling apparatus is substantially continuous to a sampler pump which periodically displaces a sample of the flow into a sample collecting apparatus maintained full of sealing liquid and at a pressure higher than the vapor pressure of the most volatile components in the pipeline to prevent vaporization of part of the sample. Liquid displaced from the sample container is displaced into a reservoir. A rupture disc in a bypass in the line to the reservoir provides protection against excessive pressures in the sampling apparatus. A gas-filled accumulator protects the apparatus against pressure reductions caused ordinarily by temperature drops when the pipeline is shut down.

The single FIGURE of the drawings is a diagrammatic flow sheet of the sampling apparatus of this invention.

Referring to the drawing, the pipeline from which the sample is to be collected is indicated by reference numeral 10. An orifice plate 12 installed in the pipeline creates an obstruction to flow through the pipeline and thereby provides a pressure differential in the pipeline adequate to maintain flow to the sampling apparatus. An inlet line 13 tapped into the pipeline 10 upstream from the orifice plate 12 is connected to a suction line 11 to the inlet of a sampler pump 16. In the apparatus illustrated in the drawings, two check valves 15 are provided in the suction line 11 to permit flow into pump 16 from line 13 and prohibit flow in the opposite direction. The valves are connected in series as shown to allow the sampler to continue operating if one valve should fail. Check valves 15 may be separate units connected in the suction line 11 or may be inlet valves forming an integral part of the pump. A return line 14 is connected to the junction of the suction line 11 and inlet line 13 and is tapped into the pipeline 10 downstream from orifice 12. Inlet line 13 is provided with a valve 50, and outlet line 14 is provided with a valve 51 as desired for maintenance and operation of the apparatus.

A sample line 19 extends from the sampler pump 16 to the upper end of a sample bomb 24. Two check valves 17 in sample line 19 allow flow only in the direction from the sampler pump 16 to the sample bomb 24. Again, two check valves are provided as a safeguard against valve failure.

Sample bomb 24 is a standard ICC approved type of sample container having a valve 25 at its top and a valve 52 at its bottom. Valves 18 and 27 in lines to and from the sample bomb allow the lines to be closed when the sample bomb is removed. The volume of the sample bomb 24 should be larger than the volume of the composite sample that is to be collected for the analysis. Ordinarily a sample bomb of 5-gallon capacity is adequate.

A displacement liquid line 26 connected to valve 52 at the bottom of the sample bomb extends to a back pressure regulator 29 that maintains a pressure on the sample bomb 24 higher than the vapor pressure of the most volatile components of the liquid to be sampled. The back pressure regulator 29 is protected on the inlet side by a filter 28 to prevent foreign material entering the seat area of the regulator.

An accumulator 31 filled with an expandable gas such as nitrogen is connected to line 26 between sample bomb 24 and back pressure regulator 29 to compensate for any volumetric change in the sample due to temperature change in the contained sample and/or liquid seal. Pressure gauge 30 communicating with line 26 allows observation of the pressure in the sample collecting system. Any change in pressure in the sample section below the setting of the back pressure regulator 29 indicates component failure.

A relief bypass line 35 around pressure regulator 29 is provided with a union-type rupture disc assembly 32. A valve 33 is installed in line 35 between a check valve 34 and the rupture disc 33 to allow checking for leakage from the sample area. Check valve 34, which is set to open to allow flow through line 35 when the pressure in line 35 between the rupture disc 32 and the check valve 34 exceeds the pressure downstream of the check valve 34 by about 10 psi, protects the downstream side of the rupture disc 32 from pipeline pressure. A valve 33 opening off line 35 permits checking for leaks in the rupture disc 33 and check valve 34. The bypass assembly provides positive protection against failure of pressure regulator 29 which could cause excessive pressure buildup in the sample container. Check valve 34 prevents application of pressure against the downstream side of the rupture disc 33. Experience has shown that flexing of the rupture disc caused by variations in pressure on the downstream side of the disc results in rapid failure of the disc.

A liquid line 36 connects the outlet side of back pressure regulator 29 to the lower end of a displacement liquid reservoir 38 equipped with a sight glass 39 to allow determination of the size of sample that has been collected. Bypass line 35 is connected into line 36 to deliver liquids flowing through the bypass into reservoir 38. A valve 44 in a drain line 45 from the lower end of the reservoir 38 allows drainage of displacement liquid from the reservoir at the beginning of the sampling operation as hereinafter described. A line 43 extends from the upper end of the reservoir to the pipeline 10 downstream of the orifice 12. A normally open valve 53 in line 43 and a valve 37 in line 36 allow the reservoir to be cut off from the rest of the sampling system. A second valve 54 in line 43 can be closed to cut off line 43 from pipeline 10 when the sampling system is dismantled. A gauge 40 on line 43 will give an indication of the pipeline 10 and/or displacement liquid reservoir pressure. Comparison between gauge 40 and gauge 30 will give a visual indication of the difference in pipeline 10 pressure and sample bomb 24 pressure. Sample bomb pressure must be at least 10 psi greater than pipeline 10 pressure to assure proper operation.

Valve 41 at the upper end of displacement liquid reservoir 38 is used to assure complete liquid fill of displacement liquid reservoir 38, sight glass 39, and all associated piping from pipeline 10 to the outlet on back pressure regulator 29 at line 36. Vapors and/or gases are vented through line 42 until liquid is discharged from line 42 and the valve 41 is closed. The reservoir is always at pipeline 10 pressure. Flow from the pipeline 10 through displacement liquid reservoir 38 and line 36 is prevented by the back-pressure regulator 29 and through line 35 by check valve 34.

In the apparatus illustrated in the drawings, the length of stroke of sampling pump 16 can be adjusted to provide a variable volume pump. Sampling pump 16 is actuated by compressed air, from a source not shown, delivered through line 20. Filter-regulator set 21 filters and reduces the pressure of compressed air in line 20 to 50 psig. This pressure is supplied to the inlet of a normally closed electrically operated three-way solenoid valve 22. Solenoid valve 22 is actuated to open by a voltage applied through a set of contacts in an electrical timer 23. The applied voltage from timer 23 energizes solenoid valve 22 for a predetermined time period allowing compressed air to flow from line 20 through solenoid valve 22 through line 55 to the motor side of the adjustable stroke sample pump 16. The electrical timer 23 is actuated by a pulse from a counter or integrator, indicated generally by reference numeral 56, that accurately measures the flow of the liquid flowing in pipeline 10 and actuates the timer with a frequency that is proportional to the rate of flow through the pipeline. Suitable counters or integrators that will signal the timer 23 with a frequency proportional to the rate of flow in pipeline 10 are commercially available, and this invention is not limited to a particular type of such equipment. A truly proportional composite sample is obtained by this apparatus by collecting a sample in a direct ratio of fluid ounces of sample per each desired number of barrels of product flowing in the pipeline. The rate of sampling is independent of time and dependent only on the volume of product that passes through the pipeline.

For a description of the operation of this invention, it will be assumed that a complete sample has just been accumulated in a sample container 24. Valves 18, 25, 27 and 52 are closed and the sample container 24 removed from the system by disconnecting between valves 18 and 25 and between valves 27 and 52. A replacement sample container equipped with valves 25 and 52 and filled with a displacement liquid is then connected in the system. Any liquid in which the pipeline liquids are virtually insoluble can be used as a displacement liquid. A preferred displacement liquid is an aqueous solution comprising approximately 50 percent water and 50 percent glycol.

Valve 37 in line 36 adjacent displacement liquid reservoir 38 is closed and valve 44 in drain line 45 is opened. Valves 53 and 54 in line 43 are open and allow hydrocarbon products from flowline 10 to flow from line 42 and into the upper end of the displacement liquid reservoir 38. Displacement liquid collected in the reservoir while taking the previous sample is drained through line 45 from the reservoir 38 to fill the reservoir with pipeline liquids and then valve 44 is closed. Valve 41 is opened to vent gases from the reservoir 38 to make sure the reservoir is filled with liquid and then valve 41 is closed. Valves 18, 25, 52, 27, and 37 are then opened, and the apparatus is in condition for operation.

Signals from the integrator 56 are delivered to timer 23 with a frequency that is proportional to the rate of flow of liquids through pipeline 10. The signals cause the timer 23 to apply voltage for the predetermined time to solenoid valve 22. Each time voltage is applied to solenoid valve 22, the regulated air supply passes through solenoid valve 22 from line 20 to line 55 to sample pump 16. This pneumatic pressure on the piston operating the sample pump causes the plunger in the pump to move to a position forcing the liquid trapped in the pump body by check valves 17 and 15 through check valves 17 to line 19 and into sample bomb 24. Timer 23 times out after a predetermined time turning the voltage off solenoid valve 22 and venting line 55 through solenoid valve 22 to the atmosphere. A spring under the piston of sample pump 16 forces the piston and plunger into their open position. This action leaves a void in sample pump 16 which is filled by product from pipeline 10 through line 13 through check valves 15 by the pressure in the pipeline. This sample is now trapped in the body of sample pump 16 by check valves 15 and 17 until solenoid valve 22 is again actuated by timer 23.

With each actuation of the timer 23 a measured amount of the product being sampled is forced through line 19 into the top of sample container 24. The liquid forced into the sample container through line 19 and valve 25 displaces an equal amount of displacement liquid from the sample bomb 24 through valve 52 and line 26 to back pressure regulator 29. Back pressure regulator 29 restricts the flow from line 26 through line 36 into reservoir 38 to maintain the pressure in sample bomb 24 high enough to prevent vaporization of the more volatile components of the sample.

The pressure maintained in sample bomb 24 will depend upon the composition of the liquids in pipeline 10 and the temperature of the liquids. In a typical installation in which the liquid flowing through pipeline 10 is LPG containing propane, butane and some heavier hydrocarbons, back pressure regulator 29 can be set to maintain a pressure of 800 to 1,500 psi in sample bomb 24. As collection of the sample continues, displacement liquid entering reservoir 38 through line 36 displaces hydrocarbons in the upper portion of the reservoir through line 43 into pipeline 10. The amount of the sample collected can be determined at any instant from the change in level of liquid in sight glass 39. After the desired volume of sample has been collected, timer 23 is inactivated, valves 18, 25, 52 and 27 are closed and sample bomb 24 is removed. Another sample bomb is connected to lines 19 and 26, timer 23 is reactivated, and the procedure repeated.

If the gas sampling apparatus should be shut down for any reason such as interruption of flow through the pipeline 10, the sampling pump 16 will stop operating and, therefore, discontinue displacement of liquid into the sample bomb 24. If the shutdown should be for an extended period during which there is a temperature drop, the liquids in the sample container 24 will contract and reduce the pressure on the system. Pressure regulator 29 prevents flow of displacement liquid from reservoir 38 into the sample container 24, and the lower pressure on the sample pump side of check valves 17 causes those valves to remain closed. It has been found that contraction from cooling the liquids in the sample container 24 can reduce the pressure sufficiently to cause vaporization of some of the liquids in the sample container as a result of the reduced pressure therein. The gas in accumulator 31 expands as a result of the reduced pressure and maintains the pressure in the system high enough to prevent vaporization.

During the operation of the sampling apparatus, pressure regulator 29 may fail and prevent flow of liquids through line 36 into the displacement liquid reservoir 38. Continued operation of sampler pump 16 can increase the pressure in the sample bomb to excessive levels. The rupture disc 32 provides positive relief against excessive pressures, and the loading of check valve 34 maintains the liquids in the sample container above the pressure in pipeline 10 after rupture of disc 32. By connecting bypass line 35 into line 36, liquid displaced from the sample container 24 is delivered into the reservoir 38 and is not lost into the pipeline 10.

This invention provides a method and apparatus for obtaining a composite sample of pipeline liquids that is truly representative of the pipeline liquids. The unique sampler pump increases the pressure on the sample to a pressure high enough to preclude vaporization of the most volatile components of the liquids.

What is claimed is:

1. Apparatus for obtaining a composite sample of liquids flowing through a pipeline comprising a sample line to be connected into the pipeline, a sampler pump having an inlet connected to the sample line, a sample container, a sample delivery line connected to the outlet of the sampler pump and to the upper end of the sample container, a check valve in the sample delivery line allowing flow only in the direction from the sampler pump to the sample container, a displacement liquid line extending from the lower end of the sample container, a displacement liquid reservoir connected to the end of the displacement liquid line remote from the sample container, a pressure regulator in the displacement liquid line between the displacement liquid reservoir and the sample container adapted to maintain pressure in the sample container higher than the pressure in the displacement liquid reservoir, and a gas-filled accumulator connected to the displacement liquid line between the pressure regulator and the sample container to maintain pressure in the sample container during shutdown of the pipeline.

2. Apparatus for obtaining a composite sample of liquids flowing through a pipeline comprising a sample line to be connected into the pipeline, a sampler pump having an inlet connected to the sample line, a sample container, a sample delivery line connected to the outlet of the sampler pump and to the upper end of the sample container, a check valve in the sample delivery line allowing flow only in the direction from the sampler pump to the sample container, a displacement liquid line extending from the lower end of the sample container, a displacement liquid reservoir connected to the end of the displacement liquid line remote from the sample container, a pressure regulator in the displacement liquid line between the displacement liquid reservoir and the sample container adapted to maintain pressure in the sample container higher than the pressure in the displacement liquid reservoir, a bypass line having an inlet opening into the displacement liquid line between the pressure regulator and the sample container and an outlet opening into the displacement liquid line between the displacement liquid reservoir and the pressure regulator, a rupture disc in the bypass line, and a spring-loaded check valve in the bypass line between the rupture disc and the displacement reservoir adapted to maintain pressure in the bypass line at the rupture disc higher than pressure in the displacement liquid reservoir.

3. Apparatus as set forth in claim 1 including a bypass having an inlet opening into the displacement liquid line between the sample container and the pressure regulator and an outlet opening into the displacement liquid line between the displacement liquid reservoir and the pressure regulator, a rupture disc in the bypass, and a spring-loaded check valve permitting flow from the rupture disc to the displacement liquid reservoir and adapted to maintain pressure in the rupture disc higher than pressure in the displacement liquid reservoir.

4. In apparatus for taking a composite sample including a sample from a pipeline including a sample line connected into the pipeline, a sampler pump adapted to pump liquid from the sample line through a sample delivery line to a sample container, a displacement liquid reservoir, a displacement liquid line from the lower end of the sample container to the displacement liquid reservoir, and a pressure regulator in the displacement liquid line, the improvement comprising a gas-filled accumulator connected into the displacement liquid line between the pressure regulator and the sample container, and pressure-operated check valves in the sample delivery line permitting flow only from the sampler pump to the sample container.

5. Apparatus for collecting a composite sample of liquids flowing through a pipeline comprising an obstruction in the liquid pipeline adapted to cause a pressure differential in the pipeline, a sample line having an inlet connected into the pipeline upstream of the obstruction and an outlet connected into the pipeline downstream of the obstruction whereby pipeline liquids flow continually through the sample line, a sampler pump having an inlet connected to the sample line and an outlet, a sample container, a sample delivery line extending from the outlet of the sampler pump to the upper end of the sample container, a check valve in the sample delivery line permitting flow only from the sampler pump to the sample container, a displacement liquid reservoir, a displacement liquid line extending from the lower end of the sample container to the lower end of the displacement liquid reservoir, a line connected to the upper end of the displacement liquid reservoir and to the pipeline downstream of the obstruction, a pressure regulator in the displacement liquid line loaded to maintain pressure in the sample container higher than the pressure in the displacement liquid reservoir and prevent flow from the displacement liquid reservoir to the sample container, a bypass line having an inlet opening into the displacement liquid line between the pressure regulator and sample container and an outlet opening into the displacement liquid line between the pressure regulator and displacement liquid reservoir, a rupture disc in the bypass line, a check valve in the bypass line between the rupture disc and the displacement liquid reservoir loaded to maintain pressure in the bypass line at the rupture disc higher than pressure in the displacement liquid reservoir, and a gas-filled accumulator opening into the displacement liquid line between the pressure regulator and the sample container.

6. Apparatus as set forth in claim 5 in which the sampler pump is a plunger-operated pump of variable stroke and means actuate the pump with a frequency proportional to the rate of flow through the pipeline.

* * * * *